Aug. 28, 1951  R. L. ARCHBOLD  2,566,014
TIMING DEVICE

Filed April 21, 1950  2 Sheets-Sheet 1

INVENTOR.
RALPH L. ARCHBOLD
BY
W. G. Sullivan
ATTORNEY

Aug. 28, 1951 R. L. ARCHBOLD 2,566,014
TIMING DEVICE
Filed April 21, 1950 2 Sheets-Sheet 2

INVENTOR.
RALPH L. ARCHBOLD
BY
W. D. Sullivan
ATTORNEY

Patented Aug. 28, 1951

2,566,014

UNITED STATES PATENT OFFICE 2,566,014

TIMING DEVICE

Ralph L. Archbold, Euclid, Ohio, assignor to The Apex Electrical Manufacturing Company, Cleveland, Ohio, a corporation of Ohio Application April 21, 1950, Serial No. 157,379

6 Claims. (Cl. 200—38)

This invention relates to electric timers adapted to have at least one of a plurality of operations controlled by the timer shortened by manual adjustment of the timer, and more particularly to means whereby an operation which would normally be eliminated by such adjustment may be effected.

Timers for controlling electrical circuits are in common use and comprise a constant speed motor, a plurality of disc form cams rotatable by the motor, and switches controlling circuits adapted to be actuated by the cams in a predetermined sequence. Among various uses for timers of this type are on automatically controlled washing machines wherein a control shaft extending from the timer is lifted or depressed to start the timer motor. The shaft is rotatable by the timer relative to an indicating plate and normally the timer would be started when an indexing point on the shaft is aligned with zero on the indicating plate and thereafter the cycle of operations is under control of the timer. Certain types of washing machines use a flow-regulator for water being supplied to the machine, resulting in a substantially constant rate of water supply, regardless of line pressure variations. Under these conditions it is possible to supply water for a predetermined period and insure that substantially the same amount of water will be supplied each time the machine is used.

Most washing machines having water supplied for a given interval either receive water immediately prior to actuation of the washing means or the water supply starts concurrently with the washing means. Water will be supplied for a period such as two minutes but the washing action may continue for fifteen minutes if cotton or heavily soiled articles are being washed. If silks, rayons or woolens are being washed, it is desirable to shorten the washing period to five minutes or the like. This may be effected by manually rotating or advancing the timer control shaft so that the index point is aligned with 10 on the indicating plate. However, it is first necessary, in present timers with which I am familiar, to wait until the timer index point moves from zero to two on the indicating plate for the water supply period before the wash period can be shortened. This means that an operator cannot merely load the machine and start the timer, but must wait several minutes for water to be supplied before the timer shaft can be advanced and the timer re-started. This delay is undesirable in a machine intended to be automatically controlled.

I have devised an improvement for timers of this general type whereby the timer shaft may be immediately rotated or advanced and the timer then started without eliminating the water supply period. In other words, an operator merely loads the machine, advances the timer to shorten the wash period and raises or depresses the control shaft, and thereafter the various operations including initially supplying water are automatically controlled.

According to the invention, I provide a two-part cam for controlling the water supply, comprising a circular disc and an arcuate finger planar with the disc and adapted to interlock therewith. The finger is rotatable independently of the cam shaft to which the disc is affixed and is connected to the disc by spring means which continually tend to hold the finger against a forward stop on the disc. A second rear stop limits reverse movement of the finger relative to the disc. The finger has a raised portion adapted to engage a resilient contact arm of the switch and is further provided with a detent adapted to engage an abutment. When the washing machine or the like is inoperative the abutment is in the path of the finger detent and prevents forward or advancing movement of the finger. If it is desired to wash the maximum period the control shaft is moved axially with the shaft index point at zero on the indicating scale and the finger begins to rotate with the cam disc. If it is desired to shorten the washing period the control shaft is advanced and rotates the cam shaft and cam disc but the finger is prevented from moving by contact between the abutment and the finger detent so that the cam disc is rotated relative to the finger. Upon moving the control shaft axially to start the timer, the detent is moved out of the path of the abutment and as soon as the raised portion of the finger contacts the switch arm the resultant pressure interlocks the finger and the cam disc so that water will be supplied for a period as determined by the extent of the finger raised portion. After the raised portion moves past the switch arm, the spring means effects quick rotation of the finger relative to the cam disc until the finger abuts the forward stop on the cam disc so that the finger is in proper position for another cycle of operations.

It is a primary object of the invention to provide an electric timer wherein at least one of a plurality of controlled operations may be shortened by manual adjustment of the timer, and wherein another controlled operation which would normally be eliminated by said adjustment may be maintained effective.

Another object of the invention is to provide a simple arrangement for effecting the above object essentially by replacing a unitary cam with a two-part cam.

Another object of the invention is to accomplish the above objects without substantial modification of existing timers.

Another object of the invention is to provide an electric timer for washing machines and the like whereby all the functions which the machine is intended to accomplish may be effected by initial starting of the timer so that thereafter no further attention on the part of an operator is required.

Other objects of the invention and the invention itself will be increasingly apparent from a consideration of the following description and drawings wherein.

Figure 1:
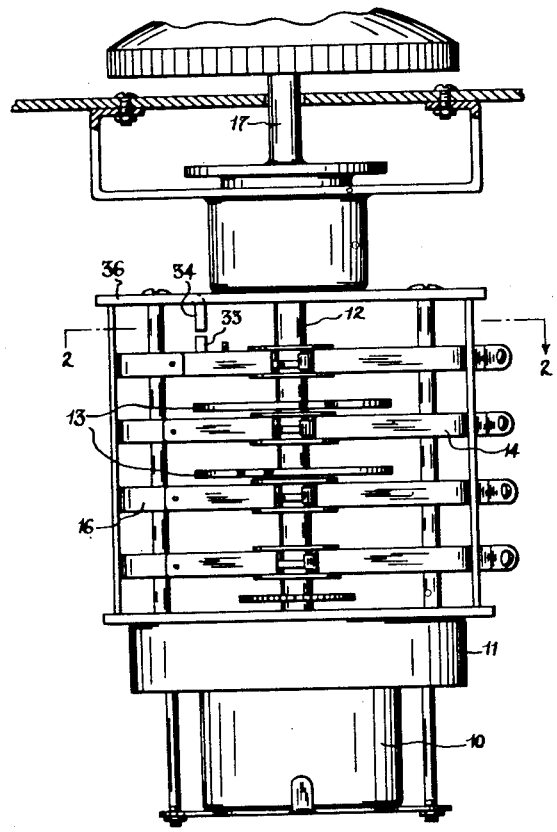
Figure 1 is a plan view of a timer embodying the invention.

Referring now to the drawings, I have indicated a constant speed electric motor at 10 which through reduction gearing in a housing 11 rotates a cam shaft 12. The cam shaft is preferably intermittently and relatively rapidly moved through an escapement mechanism also disposed in housing 11 to effect a quick make and break at the switch contacts to avoid arcing. A plurality of cam discs, as indicated at 13, are fixed to shaft 12, each disc being suitably contoured to move a resilient switch arm, such as 14, into or out of engagement with a fixed contact 16 to control a solenoid or the like circuit to effect a desired operation at a predetermined time and for a predetermined period. The cam shaft 12 is permitted limited axial movement, such as 1/8 inch, and this movement is employed to energize and de-energize the motor circuit. In the timer illustrated, manual depressing of shaft 12 energizes the motor and at the completion of a cycle a cam opens the motor circuit and raises the cam shaft and attached control shaft. The control shaft 17 is merely an extension of the cam shaft and is connected thereto by a cotter pin or the like, since it is desirable that the timer be controlled from the top surface of the machine, and for wiring convenience, the timer is disposed in the bottom portion of the machine.

Figure 3:
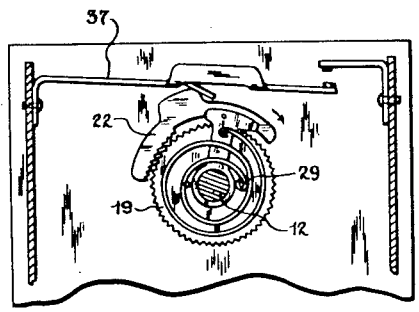
Figure 3 is a view similar to Fig. 2 showing the relative positions of the cam disc and finger when a shortened wash period is desired.
Figure 4:
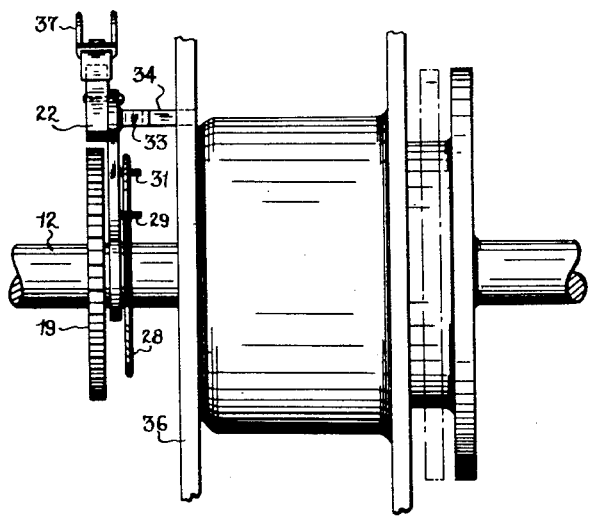
Figure 4 is an enlarged fragmentary side elevational view of the timer, showing an abutment I may employ.

In conventional timers of this type, with which I am familiar, a cam controlling the washing period has either a depressed portion, which permits a movable and resilient switch arm to engage a fixed contact, or it may have a corresponding raised portion for the same purpose dependent upon whether the fixed contact is below or above the movable contact arm. In any event, the washing period may be shortened by manually advancing the timer or rotating the cam shaft in the direction of the arrow (Fig. 3). If a second cam has a switch engaging surface adapted to energize a circuit controlling water supply valves for a period, such as two minutes, it is apparent that if the cam shaft is manually rotated to shorten the washing period more than two minutes that the water supplying operation will be by-passed. This can be avoided by starting the timer and permitting water to be supplied for two minutes, then stopping the timer, manually advancing the cam shaft and then restarting the timer. However, requiring an operator to stand idly by for two minutes or more is objectionable in an automatically controlled machine.

Figure 2:
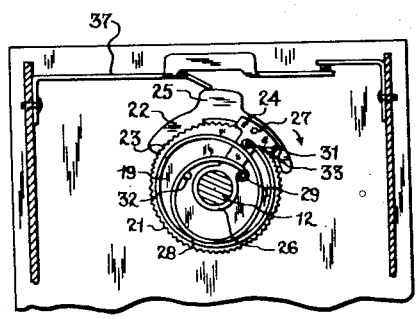
Figure 2 is a transverse section taken along the line 2—2 of Fig. 1, showing the relative positions of the cam disc and finger when a maximum washing period is desired.

As best illustrated in Figs. 2 and 3, I replace the conventional water supply cam with a two-part cam. A cam disc 19 is fixed to cam shaft 12 to be rotatable therewith and the disc is formed with a serrated peripheral edge as indicated at 21. An arcuate finger 22 is provided with a matching serrated edge as indicated at 23 and is supported by an arm 24 having a collar 26 loosely engaging the cam shaft and pivoted to finger 22 in any suitable manner as by a rivet 27. A coil spring 28 has one end secured to a pin 29 on disc 19 and its opposite end 31 secured to a pin on finger 22. Pin 29 serves as a forward stop for finger 22 and a second pin 32 on disc 19 serves as a rear stop. Arm 24 has one end upturned as indicated at 33 to serve as a detent.

When the timer is inoperative, an abutment 34, preferably in the form of an ear pressed out of the timer end plate 36, is in the the path of detent 33 so that when the leading edge of a raised portion 25 on finger 22 engages switch contact arm 37, the abutment and detent will engage. If it is not desired to shorten the wash period the cam shaft will be moved axially downward to energize the timer motor and the cam shaft will start to rotate in the direction of the arrow (Fig. 2). This axial movement of the cam shaft moves the finger detent 33 out of the path of abutment 34 permitting finger 22 to be moved with disc 19 whereby water is supplied for a desired period. In the event it is desired to shorten the wash period the cam shaft is rotated in the direction of the arrow carrying with it disc 19 but abutment 34 being in the path of detent 33 prevents movement of finger 22. When the timer has been advanced the desired amount the cam shaft is moved axially to start the timer and this moves the detent to a position avoiding the abutment. Finger 22 will then move with disc 19 and the pressure of switch arm 37 holds these parts interlocked through the serrations. At the termination of the water supply period finger 22 moves out of contact with arm 37 and the coil spring 28, which has been placed under tension, quickly rotates finger 22 forwardly relative to disc 19 until the arm 24 engages stop 29. Thereafter the cycle continues in a conventional manner under control of the timer and at the completion of the cycle when the motor 10 is de-energized the finger 22 is in proper position relative to disc 19 for initiating another cycle of operations. It will now be understood that I provide a relatively simple arrangement for accomplishing the object of the invention without substantial change and that I utilize the axial movement of the cam shaft and the pressure of the switch contact arm found in existing timers in achieving such results. Essentially, I substitute a two-part cam for the unitary cam disc of present timers and provide an abutment. Assuming the maximum reduction in the washing period to be ten minutes, this may be considered the range in which it is desired that water be supplied upon initially starting the timer. Thus, I have provided means whereby a desired operation may be effected by a timer for a predetermined period and such operation may be initiated at any point in a range comprising a greater predetermined period upon manual adjustment and starting of the timer.

I wish it to be understood that I do not desire to be limited to the exact details of construction shown and described, for obvious modifications will occur to a person skilled in the art.

What I claim is:

1. In an electric timer including a cam shaft rotatable in a given direction and adapted to be moved axially a limited amount in either direction and a resilient switch contact arm, means for effecting a desired operation for a predetermined period at any point in a range greater than said predetermined period, said means comprising a two-part cam, one cam part including a generally circular disc affixed to the cam shaft, a second cam part including an arcuate finger mounted for rotary movement independently of the disc and coaxial thereof, the finger having a portion adapted to bear against the contact arm, means for interlocking the disc and finger while the finger is in engagement with the contact arm, a detent on the finger adapted to engage an abutment to hold the finger against rotation when the cam shaft is advanced, and axial movement of the cam shaft being adapted to move the detent out of the abutment path whereby the finger will be rotated with the disc.

2. The timer as described in claim 1 and wherein spring means interconnect the disc and finger, and a stop is provided on the disc adapted to limit advancing movement of the finger relative to the disc whereby after the finger moves out of engagement with the contact arm the finger will be moved against the stop by the spring means.

3. The timer as described in claim 1 and wherein spring means interconnect the disc and finger, a pair of stops are provided on the disc adapted to limit relative rotary movement of the finger in either direction relative to the disc, and one of said stops being adapted to limit advancing movement of the finger relative to the disc whereby after the finger moves out of engagement with the contact arm the finger will be moved against said stop by the spring means.

4. The timer as described in claim 1 and wherein the finger and disc are in the same plane, and the interlocking means comprises peripheral serrations on the disc and matching serrations on the finger edge adjacent the disc.

5. The timer as described in claim 1 and wherein the means for mounting the finger comprises an arm having a collar loosely encircling the cam shaft, the finger being pivoted to said arm, and a detent being formed by an upturned edge of the arm.

6. The timer as described in claim 1 and wherein an end plate is provided on the timer adjacent the two-part cam, and the abutment is integral with the end plate and in the path of the detent when the cam shaft is in one axial position.

RALPH L. ARCHBOLD.

No references cited.